United States Patent
Shaw

(10) Patent No.: US 10,043,413 B2
(45) Date of Patent: Aug. 7, 2018

(54) ORAL-BASED METHOD AND SYSTEM FOR EDUCATING VISUALLY IMPAIRED STUDENTS

(71) Applicant: BAYLOR UNIVERSITY, Waco, TX (US)

(72) Inventor: Bryan F. Shaw, Waco, TX (US)

(73) Assignee: Baylor University, Waco, TX (US)

( * ) Notice: Subject to any disclaimer, the term of this patent is extended or adjusted under 35 U.S.C. 154(b) by 169 days.

(21) Appl. No.: 14/704,645

(22) Filed: May 5, 2015

(65) Prior Publication Data

US 2015/0325146 A1    Nov. 12, 2015

Related U.S. Application Data

(60) Provisional application No. 61/990,458, filed on May 8, 2014.

(51) Int. Cl.
*G09B 23/40* (2006.01)
*G09B 21/00* (2006.01)
*B33Y 50/00* (2015.01)

(52) U.S. Cl.
CPC ............ *G09B 21/003* (2013.01); *B33Y 50/00* (2014.12)

(58) Field of Classification Search
CPC ...... G09B 21/003; G09B 21/007; G09B 1/12; G09B 19/0023; G09B 19/0061; G09B 19/0069; G09B 19/22; G09B 23/02; G09B 23/04; G09B 23/06; G09B 23/08; G09B 23/10; G09B 23/20; G09B 23/24; G09B 23/26; G09B 23/28; G09B 23/36; G09B 23/38; G09B 23/40

USPC .......................................................... 434/114
See application file for complete search history.

(56) References Cited

U.S. PATENT DOCUMENTS

| 4,378,215 | A | * | 3/1983 | Sparks | ................. G09B 21/003 428/13 |
| 4,943,063 | A | * | 7/1990 | Moreau | ..................... A23G 3/50 273/157 R |
| 5,913,686 | A | * | 6/1999 | Vanwinkle | ............. G09B 23/30 434/262 |

(Continued)

OTHER PUBLICATIONS

M. Terfansky, M. Thangavelu, B. Fritz, B. Khoshnevis; 3D Printing of Food for Space Missions; Sep. 10-12, 2013; AIA Space Forum.*

*Primary Examiner* — Sam Yao
*Assistant Examiner* — Lily M Del Valle
(74) *Attorney, Agent, or Firm* — Jackson Walker, LLP

(57) ABSTRACT

The present disclosure provides a method and system for using oral sensory stimulation with models for educating visually impaired students. The oral senses through the mouth using a three-dimensional model of a structure offer an improved approach to educating such students. A student can insert a 3-D model in the mouth and use oral senses to feel the model and learn the shape that a non-visually impaired student can see on a computer. The model can have a reference guide for orientation that can also be used to hold the model. Further, model indicia, such as Braille, can be printed on the reference guide or model to help guide the student. The student can use other senses, such as tactile or hearing senses, to understand supplemental educational information related to the model using the oral senses to feel the model and relate such feel to the educational information.

7 Claims, 2 Drawing Sheets

(56) References Cited

U.S. PATENT DOCUMENTS

2014/0220520 A1* 8/2014 Salamini ............... A61B 5/103
434/185

* cited by examiner

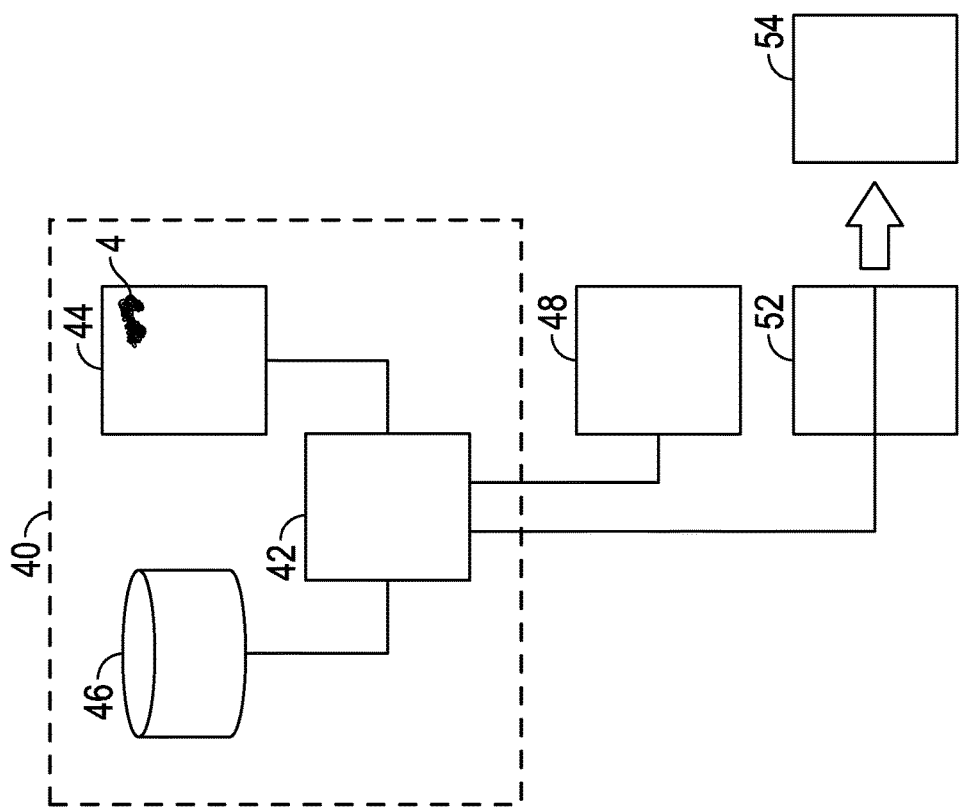
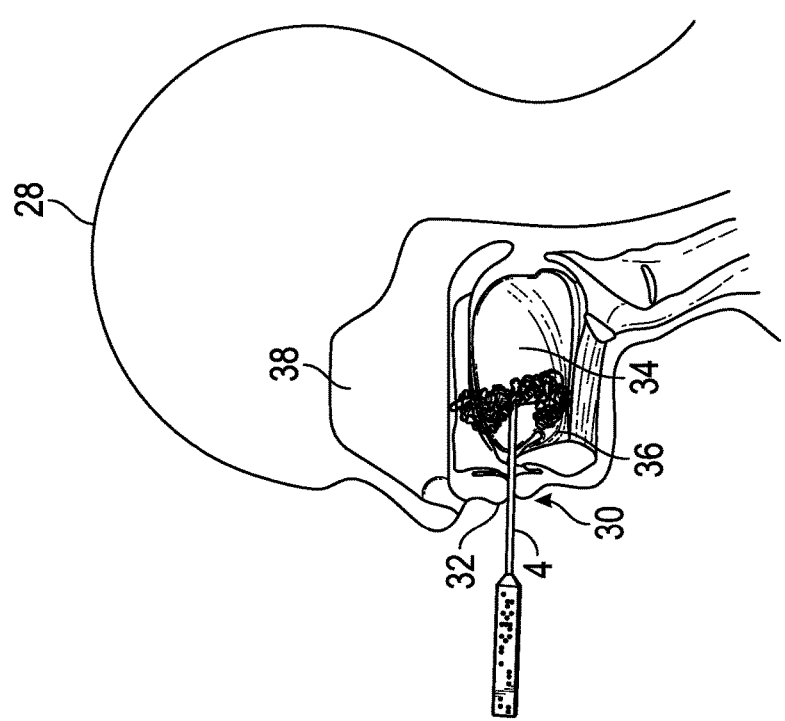
FIG. 5
FIG. 4

ORAL-BASED METHOD AND SYSTEM FOR EDUCATING VISUALLY IMPAIRED STUDENTS

CROSS REFERENCE TO RELATED APPLICATIONS

This application claims the benefit of U.S. Provisional Application No. 61/990,458, filed May 8, 2014, and is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to a method and system for educating visually impaired students. More specifically, the disclosure relates to method and system for using oral sensory stimulation with models for educating visually impaired students.

Description of the Related Art

The ability of visually impaired students to adapt to alternative education is truly amazing. Historically, such students have relied on other senses such as enhanced hearing abilities or enhanced tactile senses through fingers. The well-known Braille system allows the students to read "text" without needing to hear the text.

However, a visual impairment presents increased challenges with current technology that often uses computer modelling to illustrate structures. Current efforts use a physical model that can be felt with the hands and fingers. The tactile senses of fingers due to their size may not be as effective for small intricate shapes that non-visually impaired students may be able to see and learn on the computer. A different approach is needed.

BRIEF SUMMARY OF THE INVENTION

The present disclosure provides a method and system for using oral sensory stimulation with models for educating visually impaired students. The oral senses through the mouth using a three-dimensional model of a structure offer an improved approach to educating such students. A student can insert a 3-D model in the mouth and use oral senses to feel the model and learn the shape that a non-visually impaired student can see on a computer. The model can have a reference guide for orientation that can also be used to hold the model. Further, model indicia, such as Braille, can be printed on the reference guide or model to help guide the student. The student can use other senses, such as tactile or hearing senses, to understand supplemental educational information related to the model using the oral senses to feel the model and relate such feel to the educational information.

Currently, the oral sensory system has not been used to teach visually impaired students any aspect of physical science or life science, such as chemistry, biology, physics, biochemistry, geology, and other such sciences. Visually impaired students are the least represented students in biochemical fields in part, because of the preponderance of visually based teaching tools. The present method and system can enhance educational avenues to empower visually impaired students in these under-represented fields.

The disclosure provides a method of educating a visually-impaired student comprising: forming a three-dimensional model of a structure, the model being sized to fit inside a human mouth; allowing a visually-impaired student to insert the model into the student's mouth; and providing supplemental educational information relative to the model to guide the student in understanding the model while inserted in the student's mouth.

The disclosure provides a system for educating a visually impaired student comprising: a three-dimensional model of a structure, the model being sized to fit inside a human mouth; and supplemental educational information relative to the model to guide the student in understanding the model while inserted in a mouth of the student.

BRIEF DESCRIPTION OF THE SEVERAL VIEWS OF THE DRAWINGS

FIG. 4 is a schematic drawing of a human mouth illustrating the different features of the mouth for an oral sensory evaluation of the exemplary models.

FIG. 5 is a schematic drawing of a computer and manufacturing system for the model.

DETAILED DESCRIPTION

Figure 1:
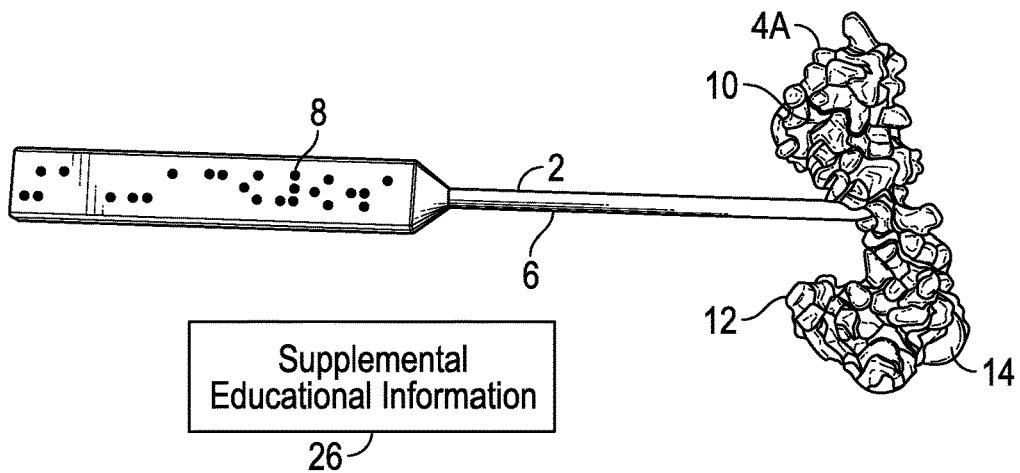
FIG. 1 is a drawing of an exemplary model of a structure for use in educating a visually-impaired student.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. Where appropriate, one or more elements may have been labeled with an "A" or "B" to designate various members of a given class of an element. When referring generally to such elements, the number without the letter is used. Further, such designations do not limit the number of members that can be used for that function.

The present disclosure provides a method and system for using oral sensory stimulation with models for educating visually impaired students. The oral senses through the mouth using a three-dimensional model of a structure offer an improved approach to educating such students. A student can insert a 3-D model in the mouth and use oral senses to feel the model and learn the shape that a non-visually impaired student can see on a computer. The model can have a reference guide, such as a stick, that can be used for orientation and to hold the model. Further, model indicia, such as Braille, can be formed on the reference guide or model to help guide the student. The student can use one or both hands with tactile senses to read the supplemental educational information related to the model using the oral senses to feel the model and relate such feel to the educational information.

FIG. 1 is a drawing of an exemplary model of a structure for use in educating a visually-impaired student. Non-visually impaired students can visually see the protein model on an imaging computer program and rotate the model on the computer to different angles. In contrast, the visually impaired student has no such latitude. However, with the present disclosure of an oral-based system, a suitable 3-D model can be formed to duplicate the computer model, provided to the student, and supplemented with educational materials suitable to the student for educating the student on the model.

More specifically, a system 2 includes a 3-D model 4A that can be sized to fit in the mouth 30 (shown in FIG. 4) of an average size human (or other sizes of mouths). The model 4A is generally based on an image viewable to non-visually impaired students on a computer. The model 4A can depict features that the oral sensors in the mouth can detect. For example, the model illustrated in FIG. 1 is a model of a protein, specifically an amino acid known as a holo-calmodulin. The model 4A has complex bulbar topology that the student can examine orally, such as shown in the features of region 10, region 12, and region 14.

To assist the student in maintaining orientation, a reference guide 6 can be coupled with the model 4A (or other models generally referenced herein as "4"). The reference guide 6 can be a handle as shown, or another guide such a surface or a projection. The reference guide can also be used to move the model in the mouth as the student senses different portions of the model, as well as provides some safety and control to avoid choking. In some embodiments, the reference guide, if used, can be detachable after insertion into the mouth to allow the student more flexibility in moving, rotating, and reorienting the model in the mouth. In some embodiments, a string can be coupled to the reference guide, such as a short projection, to allow the student flexibility in movement in the mouth, and still be able to retain control of the model for extraction from the mouth if desired or needed.

A further feature of the system 2 can include model indicia 8 coupled with the reference guide, model, or a combination thereof. The model indicia 8 can be used to impart information about the model directly to the student while handling the model 4 and reference guide 6. For example, the model indicia 8 can be a Braille identifier for the model, where the Braille identifier can be coupled to reference guide as shown. It is understood and expected that the model indicia can be coupled to the model, as well, to impart such identification information. The model indicia can include other information, such as zones or features of the model, to the student while orally examining the model. Such model indicia can be used to orient the model during the oral examination. As another example, the model indicia can include surface texture to differentiate from surrounding surfaces. Further, the model indicia can include thermal areas of different temperatures for zones or features of the model.

In at least one embodiment, the model and/or, if applicable, the reference guide can be formed from a plastic polymer, generally an approved polymer suitable for oral use. The model and/or the reference guide can also be formed of an edible material. For example, the edible material can be formed from gelatinous carbohydrates, lipids, proteins, or a combination thereof.

Generally, the system 2 includes supplemental educational information 26 relative to the model 4 to guide the student in understanding the model while inserted in the student's mouth. The supplemental educational information can provide for example indicia, features, aspects, purposes, functionality, reactivity if appropriate, and other information for the student to understand the model. The supplemental educational information 26 can be provided for a non-visually sense, such as tactile, hearing, smell, or taste, that is applicable to the student. Such information can be provided at the time of the student's oral examination of the model, or before or after such examination.

Figure 2:
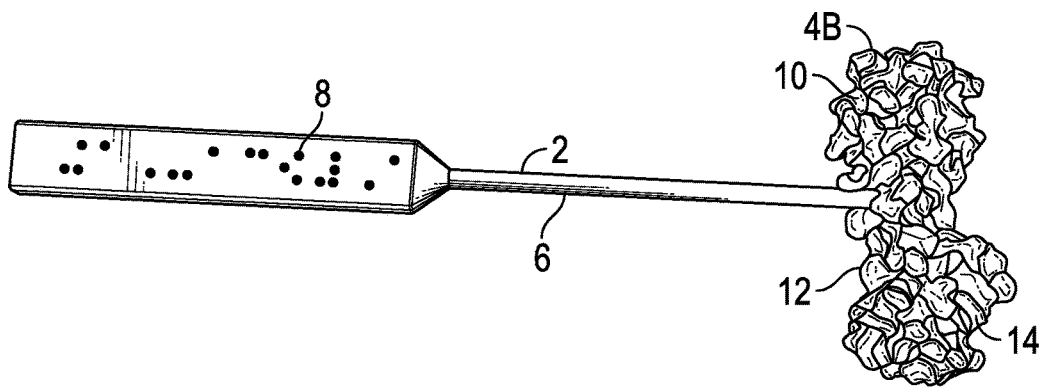
FIG. 2 is a drawing of an exemplary model of another structure for use in educating a visually impaired student.

FIG. 2 is a drawing of an exemplary model of another structure for use in educating a visually impaired student. The 3-D model 4B in FIG. 2 varies from the model 4A in FIG. 1 in that the model 4B in FIG. 2 represents a variation of the protein known as an apo-calmodulin amino acid. The model 4B has complex bulbar topology that the student can examine orally, such as the features in region 10, region 12, and region 14.

Figure 3:
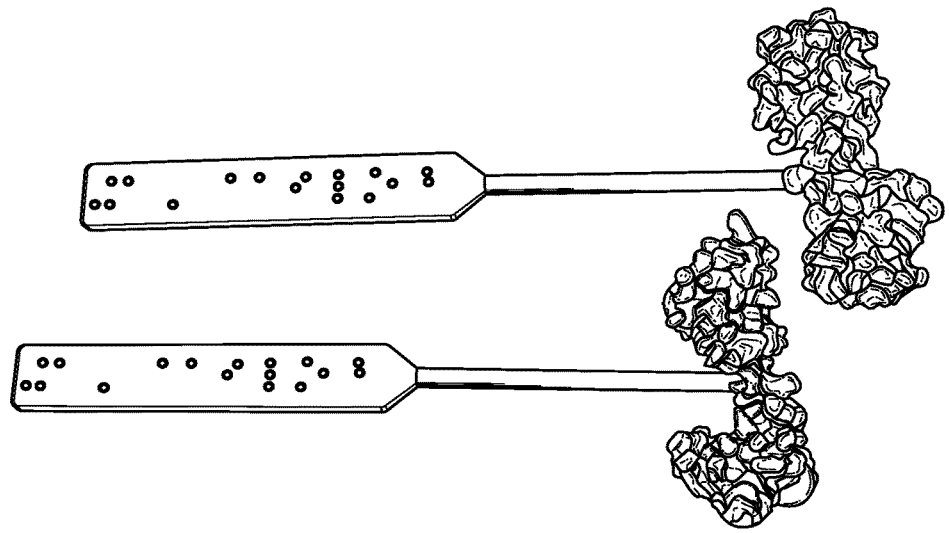
FIG. 3 is a side-by-side comparison between the two exemplary models.

FIG. 3 is a side-by-side comparison between the two exemplary models 4A and 4B shown in FIG. 1 and FIG. 2, respectively. Even though both models are calmodulin amino acids, the different prefix in the name indicate different protein structures. For example, the features in region 10, region 12, and region 14 are different between the two Figures. The complexity is difficult to understand to a visually impaired student without the facilities to examine the intricate details and subtleties.

FIG. 4 is a schematic drawing of a human mouth illustrating the different features of the mouth for an oral sensory evaluation of the exemplary models. The oral senses use primarily tactile and taste. An exemplary student 28 is shown with the system 2 and the model 4 at least partially inserted into the student's mouth 30. The student's mouth 30, lips 32, cheeks 34, and tongue 36 can contribute in various ways individually and collectively to the oral examination of the model. Further, the opening at the back of the mouth leads to the nasal cavity 38 above the mouth and to the olfactory sensors therein for the sense of smell. Thus, in some embodiments, the sense of smell is included under the term "oral senses" herein.

FIG. 5 is a schematic drawing of a computer and manufacturing system for the model. A computer 40 of the system 2 can include a processor 42, an output 44, and a memory 46. The term "computer" is broadly defined and can include a server, PC, or tablet, or smart phone, or other processing devices with an output. In general, the output will yield a visually displayable product either on a screen, in print, holographic, or other visual displays, so that a model 4 is usually available for display. In one embodiment, the computer can transmit data on the model by wire or wirelessly to a 3-D printer 48 to print the model. In other embodiments, the computer can transmit data of the model to manufacture molds 52 that can be used in a molder 54, such as an injection molding system, to produce the model on a mass production basis.

While the exemplary models are illustrated as proteins, it is understood and contemplated that the models can represent any 3-D object, such as faces of people, types of tree leaves, tree fruits and flowers, animals, numbers, letters, and other animate and inanimate objects capable of 3-D representation.

Further, the various methods and embodiments of the system can be included in combination with each other to produce variations of the disclosed methods and embodiments. Discussion of singular elements can include plural elements and vice-versa. References to an item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalent of the following claims.

What is claimed is:

1. A method of educating a visually impaired student comprising:
   providing a sized model as a three-dimensional structural representation of an object and a reference guide coupled with the model that is configured to provide a reference orientation of the model, the model configured to fit inside a human mouth of the student for learning the structural representation of the object using oral senses of the student;
   allowing a visually-impaired student to insert the model into the student's mouth; and
   providing supplemental educational information relative to the model to guide the student in understanding the model while inserted in the student's mouth.

2. The method of claim 1, further comprising coupling model indicia with the reference guide, model, or a combination thereof.

3. The method of claim 1, further comprising printing the three-dimensional model on a printer.

4. The method of claim 1, further comprising forming the model from a plastic polymer.

5. The method of claim 1, further comprising forming the model from an edible material.

6. The method of claim 4, further comprising forming the model from gelatinous carbohydrates, lipids, proteins, or a combination thereof.

7. The method of claim 1, wherein providing supplemental education information comprises tactile or audible information regarding the model.

* * * * *